United States Patent
Holdsworth et al.

[19]

[11] Patent Number: 6,044,404

[45] Date of Patent: Mar. 28, 2000

[54] APPARATUS, METHOD AND COMPUTER PROGRAM FOR PROVIDING ARBITRARY LOCKING MODES FOR CONTROLLING CONCURRENT ACCESS TO SERVER RESOURCES

[75] Inventors: Simon Antony James Holdsworth, Andover; Iain Stuart Caldwell Houston, Sherborne, both of United Kingdom

[73] Assignee: International Business Machines Corporation, Armonk, N.Y.

[21] Appl. No.: 08/958,832

[22] Filed: Oct. 28, 1997

[30] Foreign Application Priority Data

Jun. 20, 1997 [GB] United Kingdom .................. 9712930

[51] Int. Cl.[7] ..................................... G06F 13/00
[52] U.S. Cl. ........................................ 709/229; 709/226
[58] Field of Search ....................... 395/200.59, 200.56, 395/684, 726, 841; 709/229, 226

[56] References Cited

U.S. PATENT DOCUMENTS

| | | | |
|---|---|---|---|
| 5,319,780 | 6/1994 | Catino et al. ............................ | 395/600 |
| 5,454,108 | 9/1995 | Devarakonda et al. ................. | 395/650 |
| 5,596,754 | 1/1997 | Lomet ...................................... | 395/726 |
| 5,682,537 | 10/1997 | Davies et al. ........................... | 395/726 |
| 5,701,470 | 12/1997 | Joy et al. ................................. | 395/614 |
| 5,742,813 | 4/1998 | Kavanagh et al. ...................... | 395/608 |
| 5,809,506 | 9/1998 | Copeland ................................. | 707/103 |
| 5,867,708 | 2/1999 | Copeland ................................. | 395/701 |

FOREIGN PATENT DOCUMENTS

0613083 A2  8/1994  European Pat. Off. .

OTHER PUBLICATIONS

Sammett, J.E., "H.2.4 Systems", Jul. 1, 1983—pp 1–4.

*Primary Examiner*—Zarni Maung
*Attorney, Agent, or Firm*—Edward H. Duffield; Kevin J. Fournier

[57] ABSTRACT

A concurrency control mechanism for a client/server computing system analyzes each client request to determine whether it can be given concurrent access to a server's resources, along with other client requests which are presently accessing the server's resources. Each client request triggers the setting up of a lock request mode which contains conflict resolution logic based on the particulars of the corresponding request. When a new request comes in, the new request's newly created lock request mode is compared to the lock request modes of the previous requests which are currently accessing the server's resources and the conflict resolution logic is carried out to determine whether the new request should be also allowed access.

18 Claims, 3 Drawing Sheets

APPARATUS, METHOD AND COMPUTER PROGRAM FOR PROVIDING ARBITRARY LOCKING MODES FOR CONTROLLING CONCURRENT ACCESS TO SERVER RESOURCES

FIELD OF THE INVENTION

The invention relates to the field of computer systems, for example, client/server (also known as "distributed") computing systems, where one computing device ("the client") requests another computing device ("the server") to perform part of the client's work.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Application 0 677,943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called either the service or server application) running on the server computer 20 so that the service application 100 can perform the specific task required by that request, such as running a data retrieval procedure. Once this task has been completed the service application may need to send results back to the first computer 10. The service application 100 interacts with the second logic means 90 during the performance of the requested tasks and when results are to be sent back to the first computer 10. The second logic means 90 establishes instances of objects, and invokes appropriate methods of those objects, as and when required by the service application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (ORB) has been defined, which provides the object-oriented bridge between the client and the server machines. The ORB decouples the client and server applications from the object oriented implementation details, performing at least part of the work of the first and second logic means 50 and 90 as well as the connection means 80. The ORB also handles all interactions amongst various server objects of the service application 100.

Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller machine (ATM) as well as bank balances managed by a bank's main computer. Such transactions involve one particular client computer (e.g, 10) communicating with one particular server computer (e.g., 20) over a series of client requests which are processed by the server.

In typical client/server systems, client and server systems are each contributing to the overall processing of such transactions. Further, many different clients may be concurrently attempting to use the same server to engage in separate transactions. For example, many different banking ATM machines (client systems) may be trying to concurrently begin transactions so as to access data from a popular database program running on the bank's large central server. Further, there are even many different intra-server requests (i.e., requests passing from one server object to another server object) which may be part of separate (concurrent) transactions. In these situations, the server must be able to isolate these concurrent transactions so that they do not affect each other. That is, until one transaction is finished (either all parts are committed or all parts are aborted) other transactions trying to access the same server objects must be made to wait. The server objects which are involved in a transaction must be locked while the transaction is pending. Locking prevents extra-transactional concurrent accesses to the server objects which would effect the present transaction.

For example, if a husband is trying to transfer $2000 from a family's checking account into the family's higher interest paying savings account at an ATM machine at one bank on one side of town and his wife is attempting to perform the same function at another ATM (owned by a different bank) on the other side of town, the server must be able to deal with this situation effectively so that the two concurrent transactions do not create a problem for the bank owning the database server.

The way this problem has typically been solved in the object oriented programming context is for the server database program (server or service application program 100) to be written so as to not only perform the substantive functions of the program but also to perform transactional locking on concurrent accesses. That is, the server application 100 would be written so that it would lock access to the family's account data stored in the database once a first client (e.g. the husband's ATM) requests access. Then, the husband's transaction would continue in isolation despite the fact that the wife's transaction has been requested concurrently. The wife's client ATM would not be granted access to the data because the husband's client ATM would already have a lock on the object encapsulating this data.

The way such concurrency control is presently done is as follows. Each request from a client that arrives at a server must first pass through a concurrency control gateway that analyzes the request and compares it to the requests which have previously been granted access to the server resources and are still, in fact, accessing such resources. The purpose of this comparison is to determine whether the new request is compatible with the previous (and still current) requests. If so, the new request can be allowed to pass through the concurrency control gateway. If not, the new request should wait until at least one of the previous requests is finished.

Assume one client has issued a request to add money to the balance of a particular checking account (the checking account is represented in the server by a checking account object). Assume also that no other client requests have attempted to gain access to this particular checking account object. The server software has received this request and, upon analyzing it, determined from the operation involved (adding money to the balance) that this request needs to have "write access" to the checking account object (since the adding operation requires that the state of the checking account object be changed to increase the balance). Since no other request has tried to gain access to this object, there is no concurrency problem with respect to other requests, so the request is simply sent to the target object for execution of the request.

Now, while this request has access to the target object, assume another client is making a concurrent request to check the account balance of the same checking account object. The server software determines from the operation involved (checking bank balance) that this request requires "read access" to the target object. The server software then checks in a table to determine whether this new request can be given access to the target object concurrently with the other request which already has "write access". The table stores yes/no scalar values for each combination of a small number (usually about five) of access modes (read access, write access etc.).

In this example, the new request would be found from the table to conflict with the previous request, since the "read access" request must wait until the "write access" request has finished writing, otherwise the "read access" request would give a different result based on whether the "write access" request has actually changed the data or not when the "read access" request reads the data. To avoid this, the "read access" request is made to wait until the "write access" request is completely finished and is no longer accessing the target object (the "write access" request is said to have a "write lock" on the target object).

Thus, conflict between concurrent requests in the known prior art has traditionally been determined by the concurrency control gateway examining the new client request (e.g. "check balance"), converting this request into one of a small number (e.g, five) of access modes (e.g., read) and then comparing this access mode with the access modes of the previous (and still current) requests. This concurrency control technique is sufficient when the operation (e.g., "check balance") associated with a request is simple and corresponds to only one access mode (e.g., read).

However, there are situations where the relationship between an operation and an access mode is not a simple one-to-one correspondence. There are also situations where this relationship can be made more complex in order to achieve greater efficiency and/or a reduction in deadlocks (where two requests are each waiting to next access a server resource that the other request currently holds). For example, when a target object is compound (it contains or refers to other objects), conflict resolution becomes complicated and, when the abovementioned conventional approach to concurrency control is used, results in a less than desirable compromise result, such as granting a request exclusive access to a group of objects when the request only need have exclusive access to a subset thereof.

Some prior art teachings have noted the problems associated with locking using only a small number (e.g., 5) of access modes, and have thus extended the number of predefined locking modes so that operations are mapped to a larger set of access modes. See, for example, A. Z. Spector et al, "Support for Distributed Transactions in the TABS Prototype", *IEEE Transactions on Software Engineering*, June 1985, pp. 521–2.

However, this latter prior art still operates with predefined access modes, albeit a larger set thereof. The mapping between operations and access modes is predetermined, and conflict checking is still done by comparing access modes. Because of this, greater than necessary exclusive access to server resources is still given to a particular lock requester, especially in the case of a server resource represented by a compound object.

In a more complex server resource, such as one associated with a compound object, conflict resolution should ideally be performed based on a plurality of factors. For example, a queue object contains six elements (each represented as a separate object). The queue object is non-empty because it contains six elements. A first client request is to remove the first element and a second client request is to add another (i.e., a seventh) element. Each request can run concurrently under separate transactions without compromising the integrity of the queue object. The granting of access permission depends on (a) the constantly changing state of the queue object (in this case, whether it is empty or not) and (b) the details of the two requests. If the queue were empty, both requests could not be given concurrent access, even if the requests themselves were inherently non-conflicting, since the request to remove an element could not take place if the queue were empty.

A second example is a non-empty array object (containing a plurality of elements as contained objects within the containing array object). A first request is to update an existing element of the array. A second request is to delete a different existing element. A third request is to add an element at a position in the array where no element exists. And, a fourth request is to delete an array element that exists but is neither the target of requests one nor two. Each request can run concurrently under its own transaction without compromising the integrity of the array or the work done in each of the other three transactions. Again, the granting of access permission for each request depends on the state of the array object and the details of that request in its relationship with the other three.

The above-mentioned conventional conflict resolution techniques, which operate by only comparing predefined access modes, have no way of taking into account a collection of such factors and can thus lead to undesirable concurrency control results.

SUMMARY OF THE INVENTION

According to one aspect, the present invention provides a concurrency control apparatus for use in a client/server computing system where a client sends a request to a server for access to a server resource. The apparatus has a means for receiving a first client request and setting up a first lock request mode containing conflict resolution logic based on the first received request and in response to receipt of the first received request, a means for receiving a second client request and setting up a second lock request mode in response to receipt of the second client request, and a means for comparing the first and second lock request modes using the conflict resolution logic contained in the first lock request mode to determine whether the first and second requests should be given concurrent access to the server resource.

Preferably, the second lock request mode contains conflict resolution logic based on the second received request. Preferably, the conflict resolution logic of the second lock request mode is based on the first lock request mode. Preferably, the conflict resolution logic is also based on the status of the server resource for which the client request is requesting access.

According to a second aspect, the invention provides a method of performing concurrency control in such a client/server computing system, the method containing the steps outlined above with respect to the first aspect.

According to a third aspect, the invention provides a computer program product stored on a computer readable storage medium, the computer program product performing concurrency control in such a client/server computing system, the computer program product having code portions for performing the functions outlined above with respect to the first aspect.

Thus, with the present invention, conflict resolution is determined by checking a new request's lock request mode against a current request's lock request mode, thereby obtaining better concurrency control results. Specifically, by comparing lock request modes, the concurrency control mechanism of the present invention can take into account more than just the type of access mode that a request requires. For example, information concerning the target object (e.g., the state thereof) and parameters included in the request can be included as factors to be taken into account during conflict resolution.

BRIEF DESCRIPTION OF THE DRAWINGS

Details of the preferred embodiments of the present invention will now be given. The following figures are referred to in this patent application.

DETAILED DESCRIPTION OF THE PREFERRED EMBODIMENTS

Figure 1:
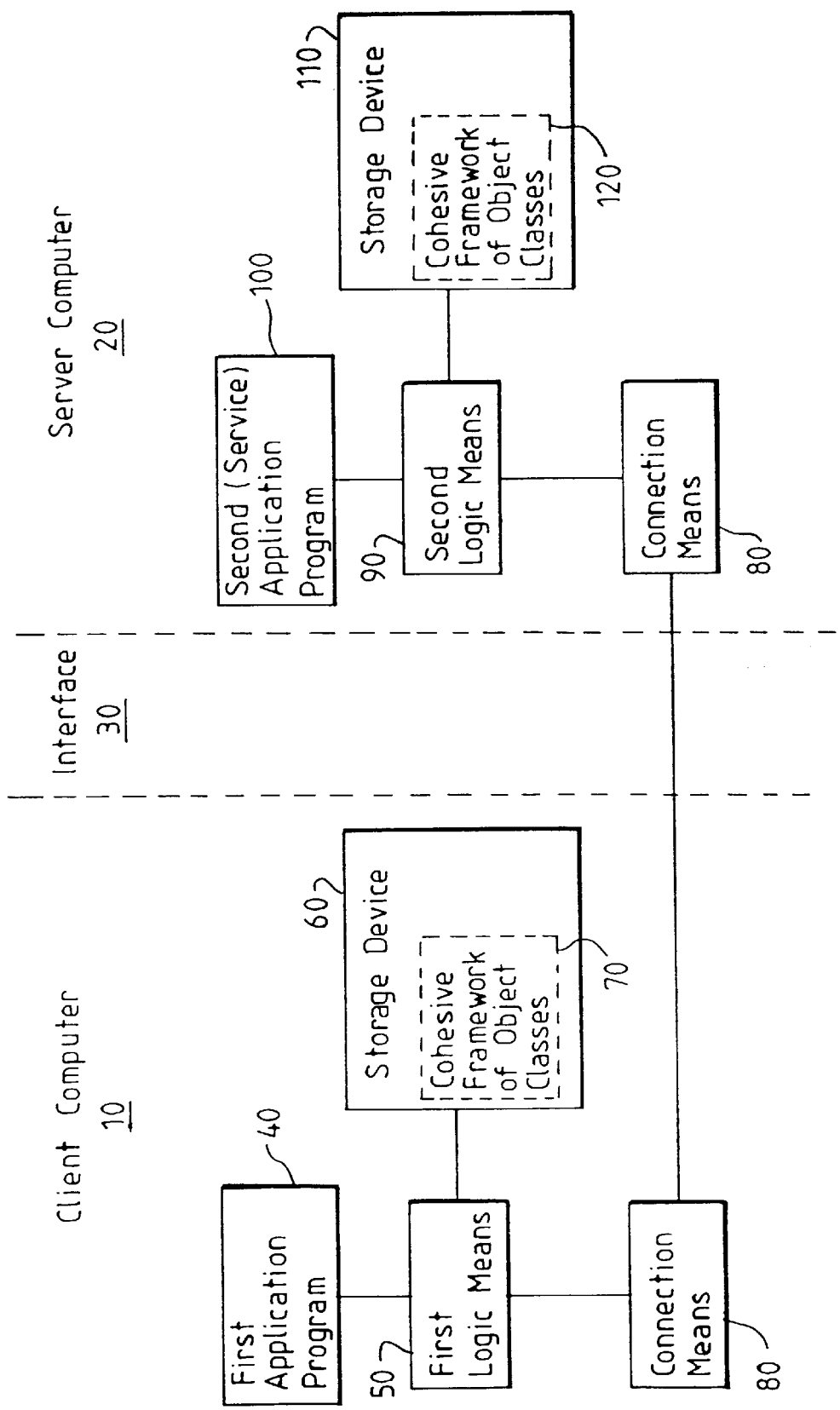
FIG. 1 is a block diagram of a well-known heterogeneous client/server architecture using object technology, in the context of which preferred embodiments of the present invention can be applied.
Figure 2:
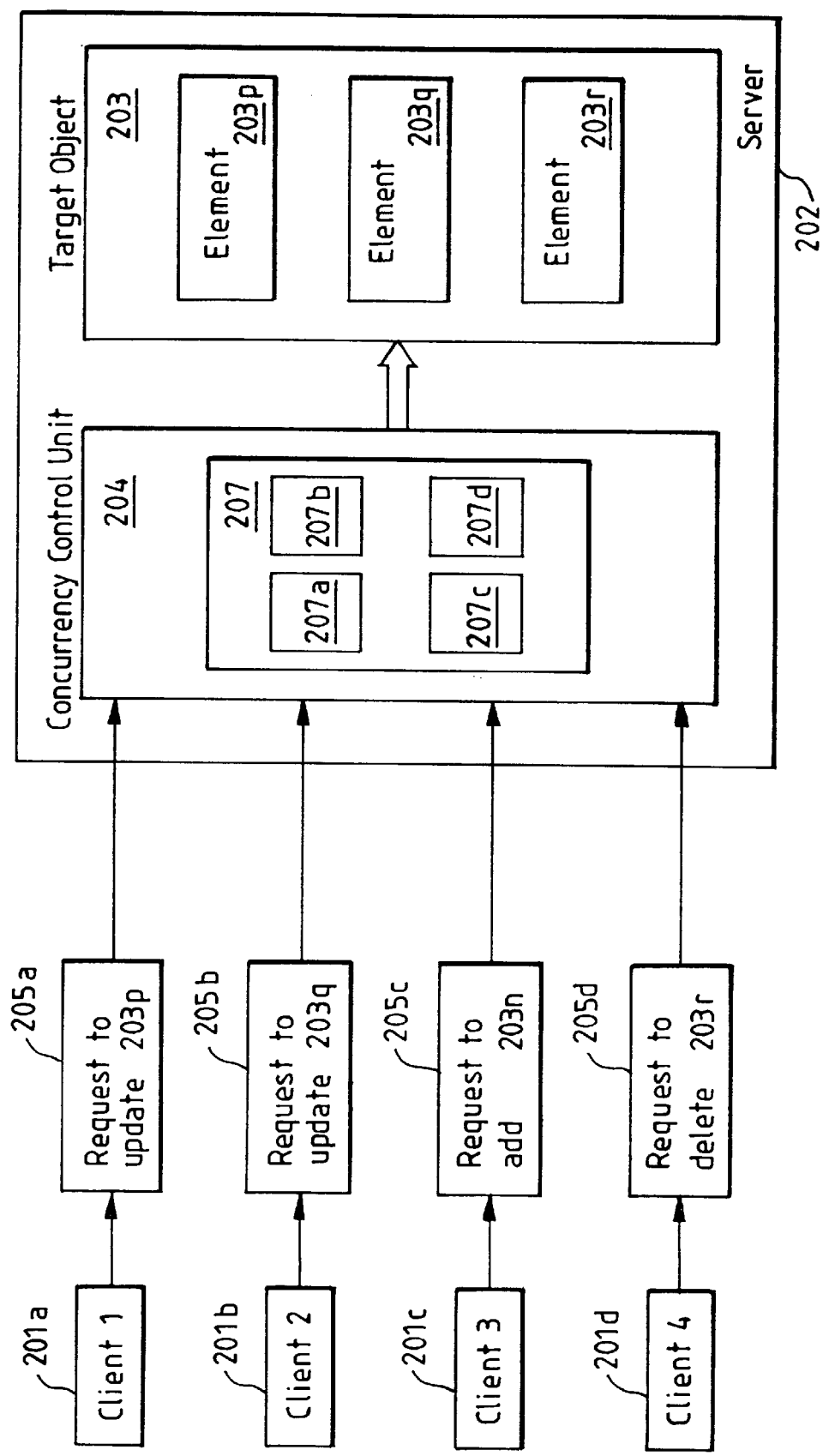
FIG. 2 is a block diagram of a client/server architecture according to a preferred embodiment of the present invention.

According to a first preferred embodiment of the present invention, a server 202 in FIG. 2 receives client requests, structured according to the OMG CORBA specification, from a plurality of clients 201*a*, 201*b*, 201*c* and 201*d*. Server 202 maintains a target object 203 which is associated with a server resource to which a client may send a request in order for the client to either obtain some information therefrom or change or add some information therein. The target object 203 could, for example, be an array object which contains a plurality of elements 203*p*, 203*q* and 203*r*, which are objects contained by the array object 203 (also known as a container or compound object).

Before a client request is allowed access to the target object 203, each request must pass through a concurrency control unit 204, which makes a decision as to whether a present request should be allowed immediate access to the target object 203, or whether the present request should be made to wait until previous (and still current) requests are finished accessing the target object 203. In this embodiment, control unit 204 is implemented as an object concurrency control service (OCCS) compatible with the OMG's CORBA specification for the object transaction service (OTS). See, e.g., CORBA Object Transaction Service Specification 1.0, OMG Document 94.8.4; and Concurrency Control Service Proposal, OMG TC Document 94.5.8.

The four clients 201a–201d are each running under a separate transaction. When a first client 201a issues a first request 205a for access to array object 203 to update element 203p, the request is processed by concurrency control unit 204 to determine whether this request can be given access to the array object 203. In this example, assume that no previous client requests have tried to gain access to object 203, and that thus the request 205 is granted access thereto in its desired access mode. That is, request 205a is allowed through the concurrency control unit 204 and performs an update on element 203p. Also, the concurrency control unit 204 adds a lock request mode object 207a to a set 207 of lock holder objects contained within concurrency control unit 204. Lock request mode object 207a contains details of the request 205a.

Then, when a second client 201b issues a concurrent unrelated (e.g. from a different transaction) request 205b, the request 205b is also sent to the concurrency control unit 204 for concurrency control. Now, since the request 205a already has access to array object 203, a conflict resolution procedure must be undertaken to determine whether the second request 205b can also be given access (or, alternatively, whether it must wait for the first request 205a to finish accessing the object 203).

The concurrency control unit 204 detects that the array 203's set 204 of lock holder objects contains the lock mode object 207a. Control unit 204 then creates lock request mode object 207b from request 205b, and then invokes the method "is_compatible_mode" on object 207a passing lock request mode 207b as a parameter. Lock request mode object 207a then performs a conflict resolution procedure based on the specific software code which has been pre-written and encapsulated therein. Lock request mode object 207a returns the reply "yes: compatible modes" if it determines that the two modes 207a and 207b are compatible with each other. Control unit 204 then allows the request 205b to access the array object 203 (and to, specifically, update element 203q), and adds the lock request mode 207b to the set of lock holders 204.

A similar pattern is repeated for each of the requests 205c and 205d, because, in this example, no conflicts occur. Specifically, upon receiving request 205c from client 201c, control unit 204 creates lock request mode 207c from request 205c, and then invokes the method "is_compatible_model" on each of objects 207a and 207b, passing lock request mode 207c as a parameter in each of the two methods. In this example, each object 207a and 207b returns the "yes: compatible modes" reply, because the request 205c to add a new element 203n to the array 203 does not affect the work requested by the concurrent requests 205a and 205b (requests to update other elements of the array). Then, upon receiving request 205d from client 201d, control unit 204 creates lock request mode 207d from request 205d, and then invokes the method "is_compatible_model" on each of objects 207a, 207b and 207c, passing lock request mode 207d as a parameter in each of the three methods. In this example, each object 207a, 207b and 207c returns the "yes: compatible modes" reply, because the request 205d to delete element 203r from the array 203 does not affect the work requested by the concurrent requests 205a and 205b (requests to update other elements of the array) or that of request 205c (requesting the addition of an element that did not exist before in the array 203).

If request 205d requested deletion of element 203q instead of element 203r, a conflict would exist, because the older request 205b already has access to element 203q of array object 203. Thus, when the "is_compatible_model" method is received by object 207b, object 207b's reply would be that the modes 207b and 207d are incompatible. In this case, request 205d would not be allowed through the concurrency control unit 204 (but its lock mode object 207d would still be added to the lock set 207). The client 201d is kept waiting until request 205b has finished its processing on the array object 203. The concurrency control unit 204 would periodically invoke the "is_compatible_modes" method (passing as a parameter the mode 207d details) onto the lock mode objects 207a, 207b and 207c to determine whether it is now alright to let the request 205d pass through. Alternatively, the control unit 204 could return a rejection response to the client 201d (in situations where the client 201d should not be made to wait).

Figure 3:
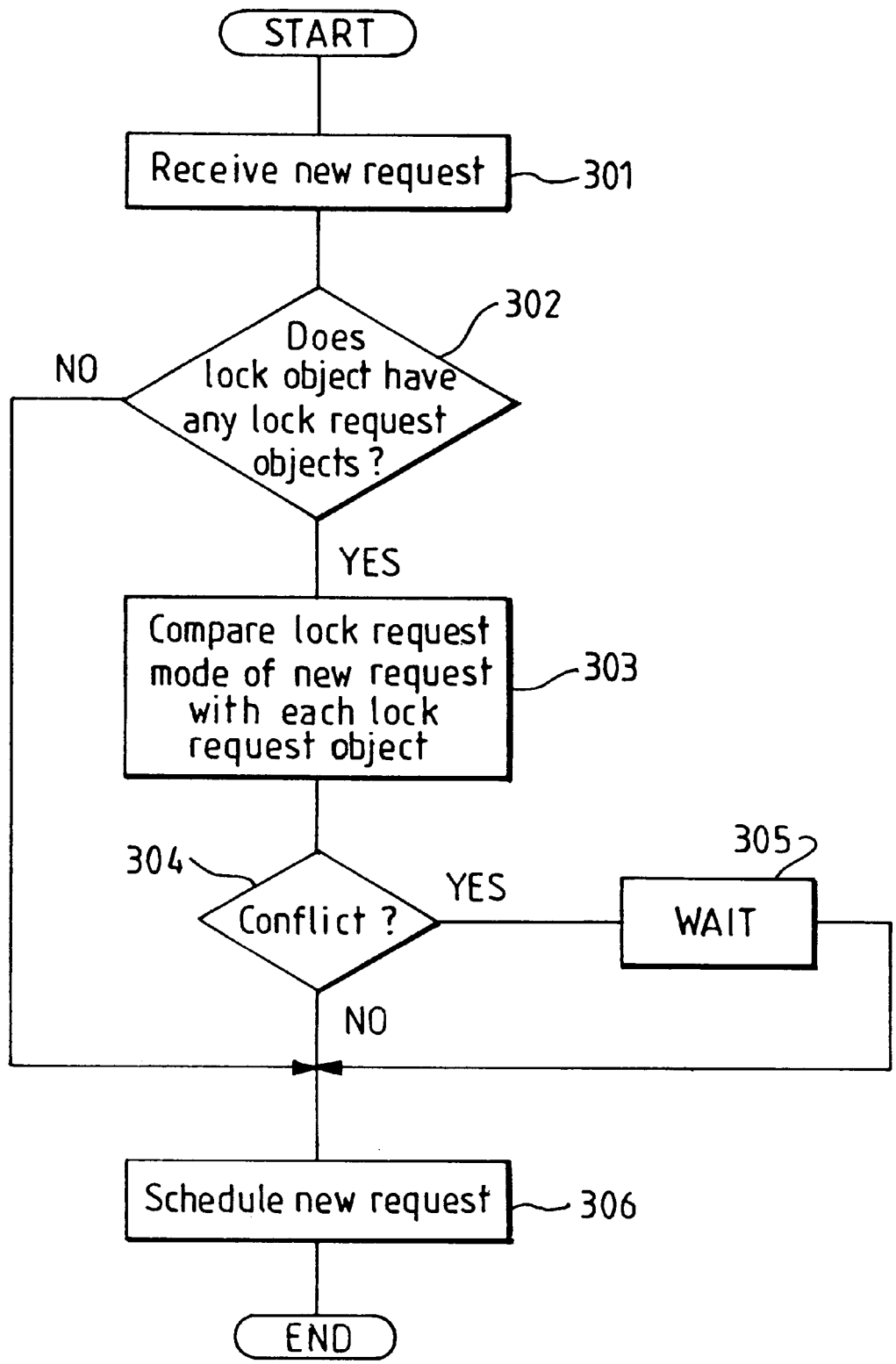
FIG. 3 is a flowchart showing the steps taken at the server for performing concurrency control in accordance with a preferred embodiment of the present invention.

Upon receiving a new request (FIG. 3's step 301), the server first checks (step 302) whether concurrency control unit 204 contains any lock request mode objects in its set 207. If it does not, this means that no prior requests have been given access to the target object 203, and thus there is no concurrency issue to deal with, so the new request is simply scheduled (step 306) for execution on the target object 203.

If, however, there are lock request mode objects in the set 207, the server software checks (step 303) the lock request mode of the new request with that of each lock mode object currently in the set 207. The lock mode objects in the set 207 represent previous requests which have already been granted access to the target object 203. Each lock mode object in the set 207 must be checked because the new request must not conflict with any of these previous requests.

In determining whether there is a conflict at step 304 the new request triggers a method call to each lock request mode object in the set 207. As the lock request mode objects stores the information relevant to the respective modes, they are best placed to determine conflict. The mode class (of which each lock request mode object is an instance) contains a method "is_compatible_mode" which can be invoked on any instance of the class. When this method is so-invoked on an instance, the instance performs its internal logic, using any parameters passed with the new request and taking into account the state of the target object 203, in order to make a decision as to whether the new request should be allowed concurrent access to the target object 203.

If there is no conflict discovered at step 304, the new request is scheduled for execution (step 306).

However, if a conflict is detected at step 304, the new request is made to wait (step 305) until there is no longer a conflict and then the new request is scheduled (step 306).

Thus, each lock request mode 207a–207d is written as an object encapsulating its own logic for determining whether other lock modes are compatible therewith. This logic can be, for example, narrowly tailored to suit the specifics of the corresponding request that triggers the instantiation of the object. Thus, when the semantics of an operation requested by a client request are complex (such as in the array object example discussed above where the object consists of multiple components) the details of such semantics can be taken into account when designing the concurrency control logic encapsulated by the lock request mode object 207a–207d. This avoids the unnecessary isolation problem (e.g, obtaining a larger scope lock than necessary) encountered in the prior art where such operations with complex semantics were attempted to be matched with one of a small number (e.g., five) of access modes, and these access modes compared during conflict resolution.

The logic can also include information concerning the status of the object 203 which the concurrency control unit 204 is protecting. For example, if target object 203 is a queue object, two concurrent requests, a first 205c to add an element 203n of the queue object 203 and a second 205d to remove (delete) an element 203r can both be given concurrent access to the queue object 203 as their operations do not inherently conflict with each other (they concern separate elements of the queue). However, they should not be given concurrent access if there are no elements in the queue object 203 (if the status of the queue object 203 is empty). Thus, before granting access permission to the second request, logic can be included in the lock request mode object 207c so that when the "is_compatible_mode" method is invoked thereon (containing the details of the lock request mode 207d as parameters) the logic will also check the status of the queue object 203 to make sure it is not empty before returning the "yes: compatible modes" reply.

The lock request mode objects 207a–207d can be programmed to include a wide variety of factors which are to be checked in determining whether a new request conflicts with the previous requests. For example, the software in the objects 207a–207d can include logic for checking as to whether the new request contains certain parameters and what the values of these parameters are. The choice of the specific logic is arbitrary and can be chosen by the server programmer to accommodate a wide variety of concurrency control possibilities.

As objects are used to represent the locking modes in the preferred embodiment, traditional concepts of object-oriented technology such as inheritance can be exploited. For example, classes of locking modes can be defined to set up the basic logic which will be used for a particular protected (target) object 203. Then, instances of a class can be instantiated to include the basic logic of the class plus any additional logic specific to the particular situation at hand.

In the preferred embodiment, the software needed to implement the concurrency control mechanism of the invention is provided in addition to the standard OMG CORBA specification. That is, once a client request makes its way into a server's ORB and is subjected to the usual ORB processing (e.g., queuing and dispatching the request within the ORB's Object Adapter etc.) the request is further processed by the additional software to perform concurrency control as described above.

In the preferred embodiment, this extra software is added by generalizing the OMG's OCCS LockSet interface (which traditionally accepts only scalar enumerated lock mode values) to define an extended mode lock set which has the same method names as the traditional lock set but which accepts a lock request mode in place of a lock mode value.

While object-oriented techniques have been used to describe the preferred embodiment, other non-object-oriented implementations are included in other embodiments of the invention. The lock request modes 207a–207d, in these embodiments, would be written not as objects but as, for example, subroutines which are called by a main program running in the concurrency control unit 204.

We claim:

1. A concurrency control apparatus for use in a client/server computing system where a client sends a request to a server for access to a server resource, said apparatus comprising:

means for receiving a first client request and setting up a first lock request mode including conflict resolution logic based on the first received request and in response to receipt of the first received request;

means for receiving a second client request and setting up a second lock request mode in response to receipt of the second client request; and means for comparing the first and second lock request modes using the conflict resolution logic contained in the first lock request mode to determine whether the first and second requests should be given concurrent access to the server resource.

2. The apparatus of claim 1 wherein said second lock request mode contains conflict resolution logic based on the second received request.

3. The apparatus of claim 2 wherein said conflict resolution logic of said second lock request mode is based on said first lock request mode.

4. The apparatus of claim 1 wherein said conflict resolution logic is also based on the status of the server resource for which the client request is requesting access.

5. The apparatus of claim 1 wherein said first lock request mode is represented by an object, and said conflict resolution logic is encapsulated within said object.

6. The apparatus of claim 5 wherein said second lock request mode is represented by an object and said means for comparing sends a message to the object representing said first lock request mode passing the object representing said second lock request mode as a parameter of the message.

7. A concurrency control method for use in a client/server computing system where a client sends a request to a server for access to a server resource, said method comprising steps of:

receiving a first client request and setting up a first lock request mode containing conflict resolution logic based on the first received request and in response to receipt of the first received request;

receiving a second client request and setting up a second lock request mode in response to receipt of the second client request; and comparing the first and second lock request modes using the conflict resolution logic contained in the first lock request mode to determine whether the first and second requests should be given concurrent access to the server resource.

8. The method of claim 7 wherein said second lock request mode contains conflict resolution logic based on the second received request.

9. The method of claim 8 wherein said conflict resolution logic of said second lock request mode is based on said first lock request mode.

10. The method of claim 7 wherein said conflict resolution logic is also based on the status of the server resource for which the client request is requesting access.

11. The method of claim 7 wherein said first lock request mode is represented by an object, and said conflict resolution logic is encapsulated within said object.

12. The method of claim 11 wherein said second lock request mode is represented by an object and during the performing of the comparing step, a message is sent to the object representing said first lock request mode passing the object representing said second lock request mode as a parameter of the message.

13. A computer program product stored on a computer readable medium for performing concurrency control for use in a client/server computing system where a client sends a request to a server for access to a server resource, said program product comprising program code elements for performing the functions of:

receiving a first client request and setting up a first lock request mode containing conflict resolution logic based on the first received request and in response to receipt of the first received request;

receiving a second client request and setting up a second lock request mode in response to receipt of the second client request; and comparing the first and second lock request modes using the conflict resolution logic contained in the first lock request mode to determine whether the first and second requests should be given concurrent access to the server resource.

14. The computer program product of claim 13 wherein said second lock request mode contains conflict resolution logic based on the second received request.

15. The computer program product of claim 14 wherein said conflict resolution logic of said second lock request mode is based on said first lock request mode.

16. The computer program product of claim 13 wherein said conflict resolution logic is also based on the status of the server resource for which the client request is requesting access.

17. The computer program product of claim 13 wherein said first lock request mode is represented by an object, and said conflict resolution logic is encapsulated within said object.

18. The computer program product of claim 17 wherein said second lock request mode is represented by an object and during the performing of the comparing step, a message is sent to the object representing said first lock request mode passing the object representing said second lock request mode as a parameter of the message.

* * * * *